United States Patent [19]
Vourlis

[11] Patent Number: 6,054,233
[45] Date of Patent: Apr. 25, 2000

[54] DESTRUCTION CONTROLLING MECHANISM FOR AN ELECTROCHEMICAL CELL

[75] Inventor: Harry Vourlis, Rocky River, Ohio

[73] Assignee: Eveready Battery Company, Inc., St. Louis, Mo.

[21] Appl. No.: 09/074,831

[22] Filed: May 8, 1998

[51] Int. Cl.$^7$ .................................................. H01M 10/02
[52] U.S. Cl. .............................. 429/61; 429/94; 429/162
[58] Field of Search ................................. 429/7, 57, 59, 429/61, 60, 66, 129, 94, 161, 170, 162

[56] References Cited

U.S. PATENT DOCUMENTS

| | | | |
|---|---|---|---|
| 4,129,686 | 12/1978 | Kaduboski | 429/61 |
| 5,508,122 | 4/1996 | Narukawa et al. | 429/94 |
| 5,747,188 | 5/1998 | Von Sacken et al. | |
| 5,925,482 | 7/1999 | Yamashita | 429/130 |

FOREIGN PATENT DOCUMENTS

| | | |
|---|---|---|
| 2129558 | 2/1996 | Canada . |
| 780920 | 6/1997 | European Pat. Off. . |
| 8-050916 | 2/1996 | Japan . |
| 8-153542 | 6/1996 | Japan . |
| 8-250155 | 9/1996 | Japan . |
| 8-255631 | 10/1996 | Japan . |
| 8-264206 | 10/1996 | Japan . |
| 9-063571 | 3/1997 | Japan . |
| 9-180761 | 7/1997 | Japan . |
| 10-116633 | 5/1998 | Japan . |
| WO96/10273 | 4/1996 | WIPO . |

OTHER PUBLICATIONS

Linden, Handbook of Batteries, Second Edition, McGraw–Hill, New York p. 36.43, 1995.
Japanese Patent Abstract for Publication No. 62229761, published Oct. 8, 1987.

*Primary Examiner*—Maria Nuzzolillo
*Assistant Examiner*—Susy Tsang
*Attorney, Agent, or Firm*—Russell H. Toye, Jr.; Robert W. Welsh

[57] ABSTRACT

An electrochemical cell is disclosed that includes a cell housing and a spiral-wound electrode assembly including wound alternating layers of a positive electrode, a separator, and a negative electrode. The electrochemical cell further includes a destruction control mechanism provided proximate an interior surface of the cell housing for piercing a portion of the separator layer to create an internal short circuit between outermost layers of the positive and negative electrodes of the spiral-wound electrode assembly when an excessive force is applied to the destruction control mechanism. The destruction control mechanism preferably includes burrs formed on the trailing end of the negative electrode that protrude toward the positive electrode so as to penetrate through the adjacent separator layer to create an internal short circuit when excessive force is applied to the burrs. Preferably, the burrs are created by stitching a conductive tab to an exposed portion of the conductive foil strip forming a portion of the negative electrode. To further increase the likelihood that the first internal short circuit will occur when the burrs penetrate the separator, the portion of the positive electrode underlying the burrs may be formed of exposed conductive foil to provide an inert region for the short circuit to occur.

27 Claims, 6 Drawing Sheets

DESTRUCTION CONTROLLING MECHANISM FOR AN ELECTROCHEMICAL CELL

BACKGROUND OF THE INVENTION

The present invention generally relates to the construction of electrochemical cells. More particularly, the present invention relates to the construction of a Li-ion electrochemical cell having a spiral-wound electrode-type construction.

High energy Li-ion batteries have received great attention in recent years due to their recharging characteristics. The markets for such batteries have been expanding through increased sales of cellular telephones, portable computers, and camcorders which use rechargeable battery packs. The battery packs used on such devices typically include a plastic housing, a plurality of interconnected electrochemical cells, and a charge control circuit mounted in the plastic housing.

Li-ion cells typically include a cylindrical cell housing made of an electrically conductive material and having an open end and a closed end. A spiral-wound electrode assembly (or jelly roll assembly), which is formed by winding alternating layers of a negative electrode, a separator, and a positive electrode about a mandrel, is inserted into the open end of the cylindrical cell housing. Subsequently, an electrolyte is deposited in the cell housing and the cell housing is then sealed by placing a cover assembly in the open end of the cell housing, with the cover assembly electrically connected to one of the electrodes (typically, the positive electrode). The cover assembly includes a seal and a conductive cover that is electrically insulated from the walls of the cylindrical cell housing by the seal.

Due to the high voltages to which these Li-ion electrochemical cells may be charged, any short circuit created within the spiral-wound electrode assembly causes relatively large levels of electric current to flow internally within the cell between the positive and negative electrodes. Such current generates a great amount of heat that can cause the cell temperature to exceed the critical temperature at which chemical reactions can take place thereby leading to excessive temperatures, excessive internal pressure, venting, heavy smoke, crimp release, and/or cell disassembly. Thus, because of the potentially hazardous reactions resulting from an internal short circuit, safety is a primary concern in the design and construction of Li-ion batteries. To evaluate the safety of Li-ion cells, standardized tests have been developed including a crush test, a nail test, an overcharge test, and a thermal abuse test. During each of these tests, a failure is deemed to have occurred if a fire or explosion results.

Many different approaches have been developed for subduing the runaway reactions of a Li-ion cell that may occur during the crush test. Examples of such approaches include doping cathodes and anodes with excess binder materials (insulators) and passivating the electrodes through electrochemical passivation techniques such as thermo-formation. However, such approaches typically result in inferior performance of the cell in areas such as capacity, fade rate, rate capability, and cycle life. Therefore, there exists the need for an improved Li-ion cell construction that passes the above safety tests and yet does not adversely affect the performance characteristics of the cell.

SUMMARY OF THE INVENTION

Accordingly, it is an aspect of the present invention to solve the above problems by providing a Li-ion electrochemical cell having a construction that incorporates a destruction controlling mechanism that controls the manner by which the cell is destroyed so as to avoid the potential for fire or explosion when the cell is exposed to conditions that would otherwise destroy it. Another aspect of the present invention is to provide a destruction controlling mechanism that does not adversely impact the performance characteristics of the cell and yet more safely controls the destruction of the cell when exposed to a destructive force or environment.

To achieve these and other aspects and advantages, an electrochemical cell constructed in accordance with the present invention preferably comprises a cell housing and a high surface area electrode assembly including alternating stacked or wound layers of a positive electrode, a separator, and a negative electrode. The electrochemical cell further preferably includes a destruction mechanism provided proximate an interior surface of the cell housing for piercing a portion of the separator to create an internal short circuit between outermost layers of the positive and negative electrodes of the electrode assembly when an excessive force is applied to the destruction mechanism.

By positioning the destruction mechanism in an appropriate location within the cell housing, an internal short circuit may be created prior to the creation of any other internal short circuits within the cell when an excessive force is applied to the exterior surface of the cell housing. Preferably, this location is in a region close to the cell housing so as to more effectively dissipate the internally generated heat to the exterior of the cell. To further enhance the likelihood that the first internal short circuit may be created in the desired location, a core pin may be inserted into the central opening in a spiral-wound electrode assembly.

The destruction mechanism preferably includes burrs formed on the outermost of the two electrodes that protrude toward the other electrode so as to penetrate through the separator layer lying therebetween to create an internal short circuit when excessive force is applied to the burrs. Preferably, the burrs are formed by stitching a conductive tab to an exposed portion of the conductive foil strip forming a portion of the outermost electrode (preferably the negative electrode). To further increase the likelihood that the first internal short circuit will occur when the burrs penetrate the separator, the portion of the electrode underlying the burrs (preferably the positive electrode) may be formed of exposed conductive foil to provide for a better electrical coupling should the burrs penetrate the separator. More importantly, by controlling the cell destruction by having the first internal short circuit created by electrically coupling the inert exposed conductive foils of the positive and negative electrodes, the short will occur in a region where resistance is lowest and where there are no active materials present that could react together, and thus the generated heat is the lowest.

These and other features, advantages, and objects of the present invention will be further understood and appreciated by those skilled in the art by reference to the following specification, claims, and appended drawings.

DETAILED DESCRIPTION OF PREFERRED EMBODIMENTS

Figure 1:
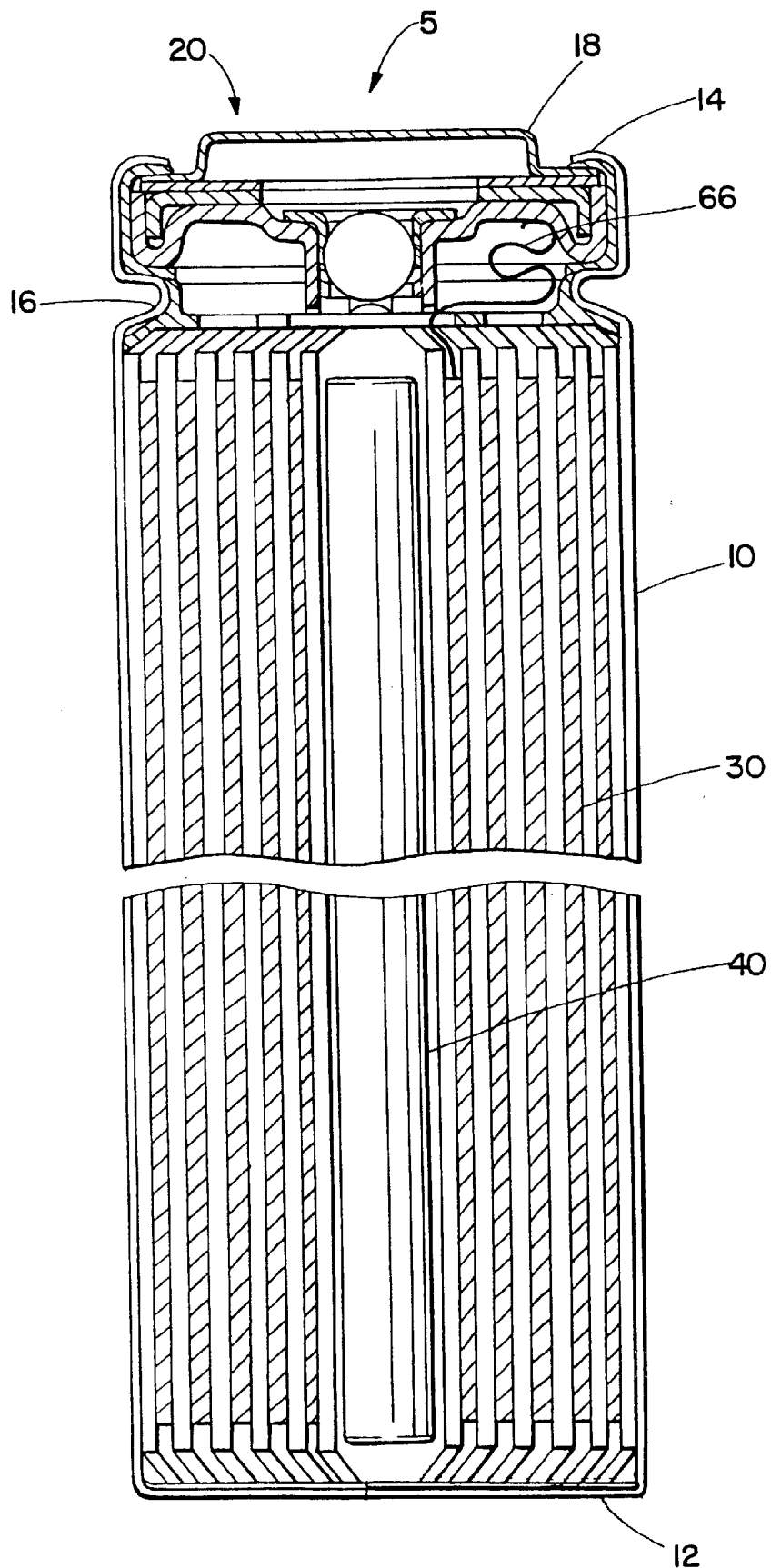
FIG. 1 is a cross-sectional view of an electrochemical cell constructed in accordance with the present invention.

FIG. 1 shows an electrochemical cell 5 constructed in accordance with the present invention. Cell 5 includes a cell housing 10 having a closed end 12 and an open end 14. Cell housing 10 may have a cylindrical or a prismatic shape and is formed of a rigid electrically conductive material. Cell housing 10 may further include a bead 16, which is an indentation formed about the circumference of can 10 near open end 14 thereof. Bead 16 is provided to give mechanical support to a cover assembly 20 that is positioned in the open end of cell housing 10. Cover assembly 20 is provided to seal the cell and provide an electrical contact that is electrically insulated from the walls of cell housing 10. In this manner, closed end 12 of housing 10 and the contact terminal defined by cover 18 of cover assembly 20 may serve as contact terminals of opposite polarity. Cover assembly 20 may be formed in any conventional manner for this type of electrochemical cell.

As shown in the drawings, electrochemical cell 5 further includes a spiral-wound electrode assembly 30, which consists of alternating layers of a negative electrode, a first separator, a positive electrode, and a second separator. Such layers may be formed by winding strips of suitable materials about a mandrel. Spiral-wound electrode assembly 30 may be wound in such a spiral manner using any conventional process. Once spiral-wound electrode assembly 30 has been wound, it is inserted into cell housing 10. A core pin 40 may optionally then be inserted into the center of spiral-wound electrode assembly 30 and an electrolyte solution is then dispensed into the open end 14 of cell housing 10. Next, cover assembly 20 is positioned in open end 14 and is held in place by crimping the ends of cell housing 10 over the edges of cover assembly 20. Cover assembly 20 is electrically connected to the positive electrode utilizing a conductive tab 66.

Although the drawings show a spiral-wound electrode structure as the electrode assembly, it will be appreciated that the present invention may be implemented in any other high surface area electrode structure. For example, the electrode structure may be formed of stacked or folded alternating electrode layers. It will further be appreciated that an electrochemical cell constructed in accordance with the principles of the present invention, may be a primary cell or a secondary (rechargeable) cell.

Having generally described the construction of an electrochemical cell in accordance with the present invention, a more detailed description of a preferred spiral-wound electrode assembly 30 is provided below with reference to FIGS. 2 and 3. Spiral-wound electrode assembly 30 is preferably formed by winding four elongated strips of materials about a mandrel in a spiraling fashion. The four strips of materials include a negative electrode 50, a positive electrode 60, and first and second separator layers 70 and 72. Separator layers 70 and 72 are positioned between negative and positive electrodes 50 and 60 so as to prevent any physical contact therebetween. Separator layers 70 and 72 preferably have a greater width than negative and positive electrodes 50 and 60 so as to prevent any physical contact of the electrodes to the interior walls of cell housing 10 or any portion of cover assembly 20.

To enable electrical connection of the appropriate electrode to either cover assembly 20 or cell housing 10, conductive tabs 56 and 66 are attached to negative and positive electrodes 50 and 60, respectively, so as to extend outward from opposite ends of spiral-wound electrode assembly 30. Preferably, positive conductive tab 66 is coupled to the electrical contact terminal of cover assembly 20 while negative conductive tab 56 physically and electrically contacts closed end 12 of cell housing 10.

Negative electrode 50 is preferably formed by coating both sides of a conductive foil strip with a mixture including an active negative electrode material, such as lithium intercalable carbon, as well as a binder. A conductive agent may also be added. Preferably, the conductive foil forming negative electrode 50 is coated with this mixture along its entire length on both sides with the exception of an inert region 54 at the trailing end (i.e., the opposite end as to that which is fed onto the mandrel during winding) of negative electrode 50. It is to this inert exposed region 54 of negative electrode 50 to which negative conductive tab 56 is attached. Conductive tab 56 is preferably attached to the exposed foil by welding. For reasons explained in more detail below, conductive tab 56 and exposed inert region 54 are then subjected to a stitching process that punctures holes through both conductive tab 56 and foil 54 to create a plurality of burrs 58 protruding outward from the surface of foil 54.

Like negative electrode 50, positive electrode 60 is formed by coating a mixture including an active material 62 such as lithiated metal oxide (e.g., $LiCoO_2$, $LiMn_2O_4$, or $LiNiO_2$) onto both sides of a conductive foil strip along its entire length except for a region to which conductive tab 66 is attached. In this case, the exposed conductive foil to which the conductive tab is attached is at the leading edge of positive electrode 60. Preferably, conductive tab 66 is welded onto the exposed leading edge of positive electrode 60 and is not stitched in the manner that conductive tab 56 is stitched onto negative electrode 50.

Figure 2:
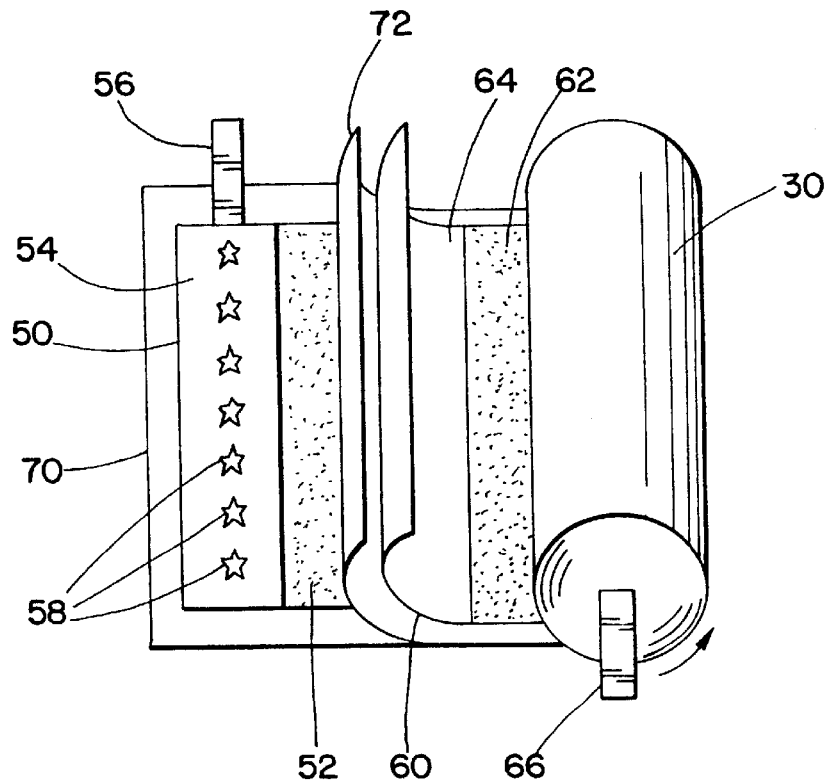
FIG. 2 is a perspective view of a partially assembled spiral-wound electrode assembly constructed in accordance with a first embodiment of the present invention.
Figure 3:
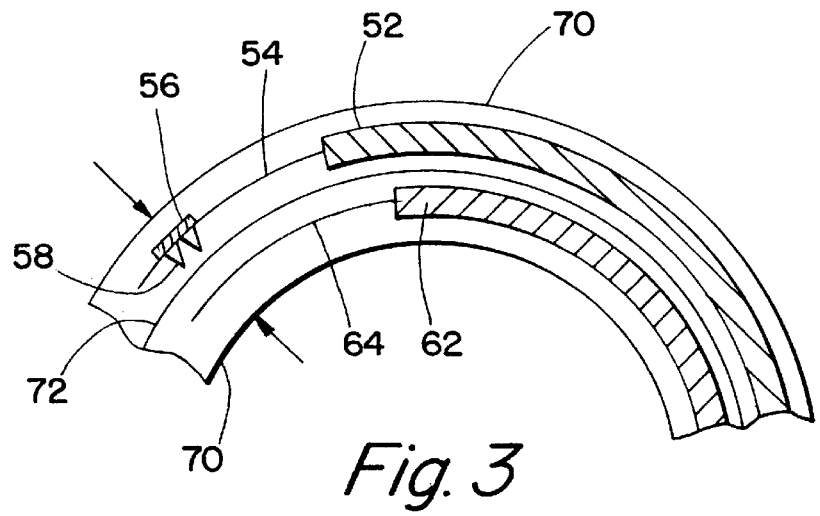
FIG. 3 is a partial cross-sectional view of a spiral-wound electrode assembly constructed in accordance with the first embodiment of the present invention.

In the most preferred embodiment shown in FIGS. 2 and 3, positive electrode 60 further includes a second exposed inert region 64 that is provided at the trailing edge thereof. By providing exposed region 64 at the trailing edge of positive electrode 60, the portion of positive electrode 60 that is positioned closest to burrs 58, is a region which is inert and thereby presents the lowest amount of resistance should burrs 58 penetrate separator layer 72 and contact exposed region 64 thereby creating an internal short circuit. Although some of the advantages of the present invention may be achieved without providing exposed region 64 such that burrs 58 would contact an active portion of positive electrode 60 upon penetrating separator layer 72 (as shown in the second embodiment in FIG. 4), the resistance presented by the burrs 58 contacting an active portion of positive electrode 60 is much greater than if burrs 58 contacted the conductive foil directly. Further, by providing exposed region 64, the area of electrode 60 where burrs 58 would come into contact is free of any electrochemically active materials that could react. Because of this lower resistance and absence of active materials in the contact area, the first embodiment shown in FIGS. 2 and 3 is less likely to generate as much heat as would the connection caused by a short circuit in the second embodiment shown in FIG. 4. It should be noted, however, that although the resistance presented through the contact of burrs 58 with an active portion of positive electrode 60 in the second embodiment is higher than that of the first embodiment, the resistance is nevertheless much lower than would be the case if active portions of both the positive and negative electrodes directly came into contact through splitting of separator layers 70 and 72. Therefore, an electrochemical cell constructed in accordance with the second embodiment is less likely than the conventional constructions to result in a runaway reaction caused by an internal short circuit.

Figure 4:
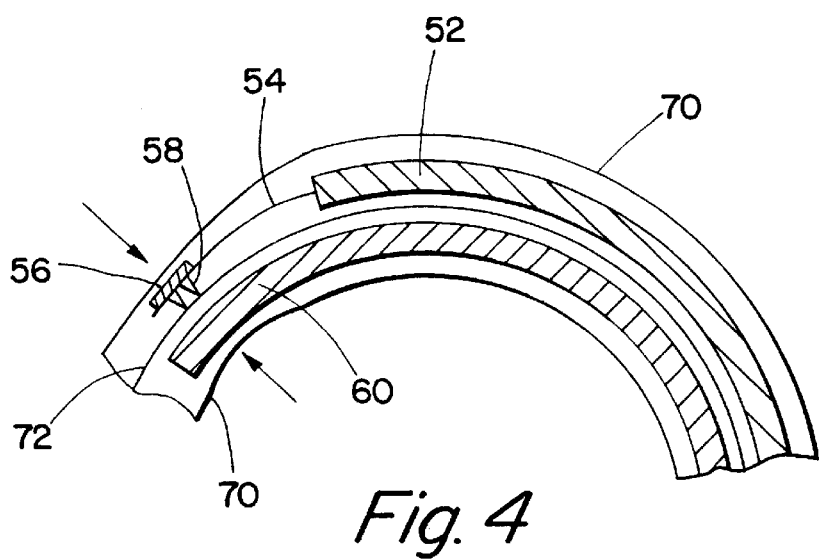
FIG. 4 is a partial cross-sectional view of a spiral-wound electrode assembly constructed in accordance with a second embodiment of the present invention.
Figure 5:
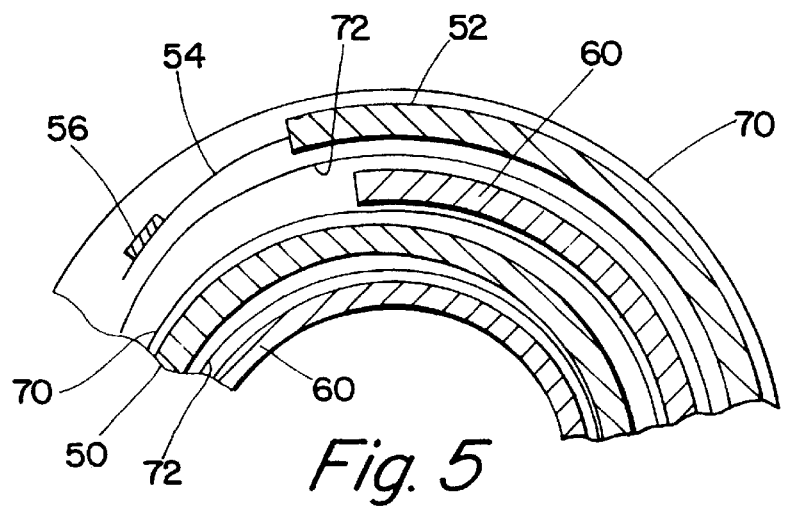
FIG. 5 is a partial cross-sectional of a comparative spiral-wound electrode assembly.

Burrs 58, such as those shown in FIGS. 2–4, are provided to serve as a means for controlling the unavoidable destruction of the cell. Such burrs are preferably oriented so as to penetrate through at least one layer of separator material and thereby create an internal short circuit when pressure is applied to the burrs. As illustrated in FIGS. 3 and 4, such pressure may be applied through the application of a force external to the cell housing, or through application of an internal force. Provided that the force required to cause burrs 58 to penetrate through a separator layer is less than the force that would be required to cause an internal short circuit to occur in any other location within the cell, burrs 58 will be the cause of the first internal short circuit within the cell. Thus, by forming such a destruction control mechanism at the most desirable location within the cell for the first short circuit to occur, the adverse effects of short circuits occurring in other locations within the cell may be significantly reduced.

By providing burrs 58 in a location so as to create an internal short circuit between the outermost layers of the positive and negative electrodes in the spiral-wound electrode, the cell housing 10 may be used as a heat sink so as to more quickly dissipate the heat generated when such a short circuit occurs. Because the amount of heat that may be generated by such an internal short circuit is sufficient to cause the liquid electrolyte to spontaneously combust, it is critical that the internally generated heat dissipate from within the cell as quickly as possible to prevent the cell from exploding and bursting into flames.

It is also desirable to position burrs 58 on a portion of one of the electrodes that is not coated with an active material. By forming burrs 58 on such an inert region 54 of an electrode 50, the resistance presented at the location of the resulting short circuit is much lower than would be the case if active regions 52 and 62 of the negative and positive electrodes were to come into contact. A low resistance at the location of the controlled short circuit is desirable because it will reduce the energy released at the location of any other internal short circuit that may occur since any internal currents will tend to flow through the path of least resistance.

Figure 7:
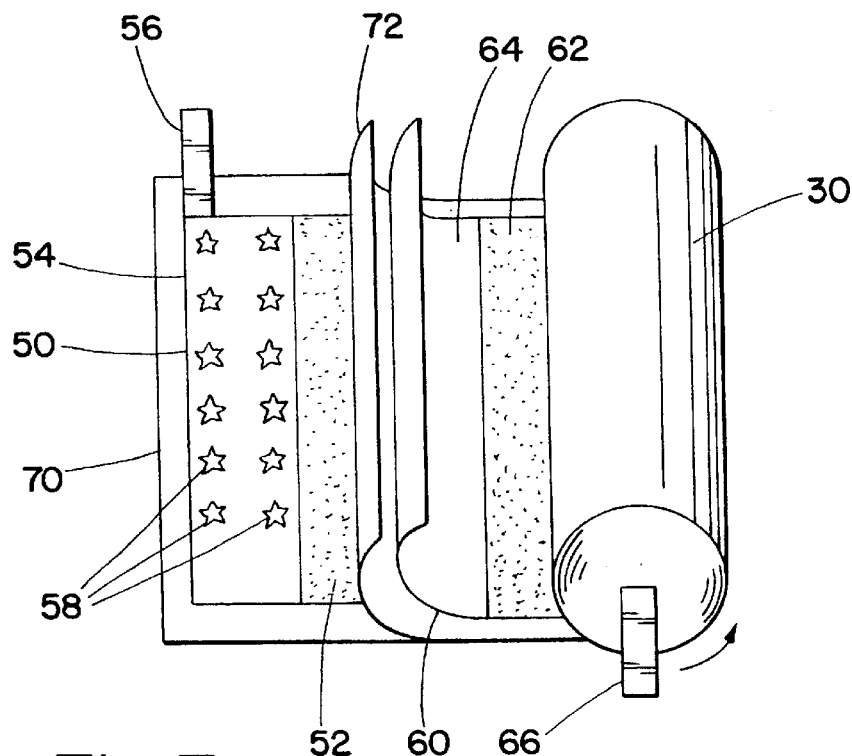
FIG. 7 is a perspective view of a partially assembled spiral-wound electrode assembly constructed in accordance with a third embodiment of the present invention.
Figure 8:
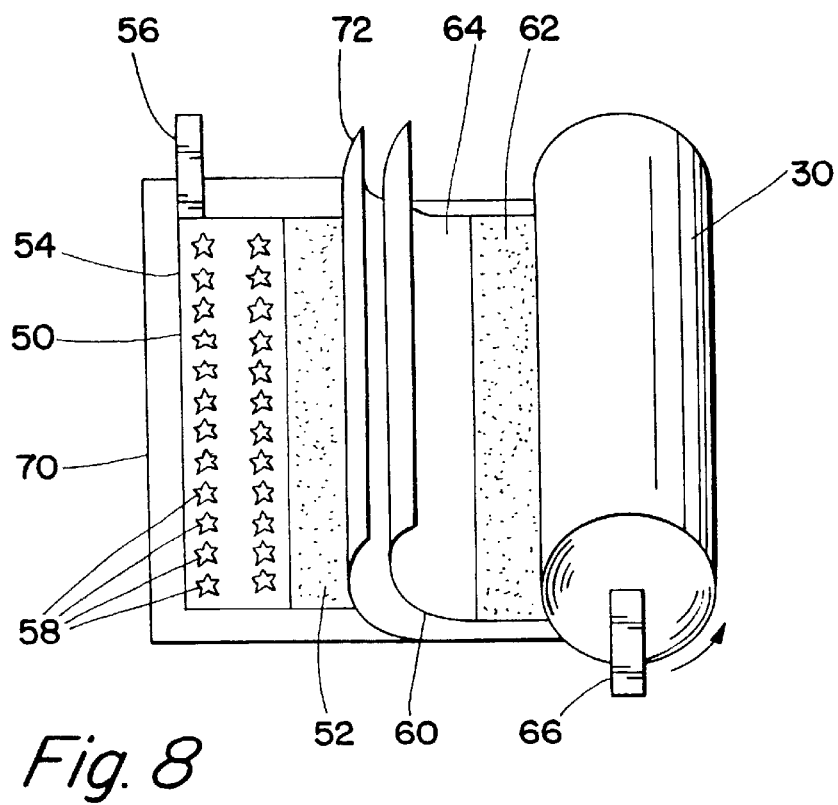
FIG. 8 is a perspective view of a partially assembled spiral-wound electrode assembly constructed in accordance with a fourth embodiment of the present invention.

As shown in FIGS. 7 and 8, two (or more) rows of burrs 58 may be formed in inert region 54. In the embodiment shown in FIG. 7, two rows of six stitches are provided, whereas in FIG. 8, two rows of twelve stitches are provided. The burrs 58 of such a second row, may be formed by stitching a second tab to the electrode. Such a second tab may be constructed to have a length less than that of tab 56 so as to not serve as an electrical connector to the cover assembly or cell housing. By forming two rows of burrs 58, the rows of burrs 58 may be offset from each other by a sufficient distance so as to be disposed 90° from one another when the electrode assembly is fully wound. In this manner, the likelihood that the burrs will cause the first of any internal short circuits is increased, particularly for those instances in which the force applied to the cell is otherwise applied in a location 90° from where a single row of burrs is located.

To verify the advantages obtained from implementing the destruction control mechanism of the present invention in a Li-ion battery, ten different lots of batteries were constructed and subsequently destroyed by performing the standardized crush test on each of the constructed cells. The results of the crush test are shown in Table 1 below.

TABLE 1

PERCENTAGE OF CRUSH TEST FAILURES

|  | No Core Pin | With Core Pin |
|---|---|---|
| Control | Lot 1 | Lot 2 |
|  | 49.2% | 12.5% |
|  | 58/118 | 5/40 |
| One row of burrs - | Lot 3 | Lot 4 |
| No inert region on trailing | 85% | 10% |
| end of positive electrode | 34/40 | 4/40 |
| One row of burrs - | Lot 5 | Lot 6 |
| Inert region on trailing end | 4.3% | 3.8% |
| of positive electrode | 5/116 | 3/80 |
| Two rows of burrs on single | Lot 7 | Lot 8 |
| tab - No inert region on | 57% | 7.5% |
| trailing end of pos. electrode | 23/40 | 3/40 |
| Two rows of six burrs on | Lot 9 |  |
| two tabs - Inert region on | 0% |  |
| trailing end of pos. electrode | 0/40 |  |
| Two rows of twelve burrs on | Lot 10 |  |
| two tabs - Inert region on | 0% |  |
| trailing end of pos. electrode | 0/40 |  |

Figure 6:
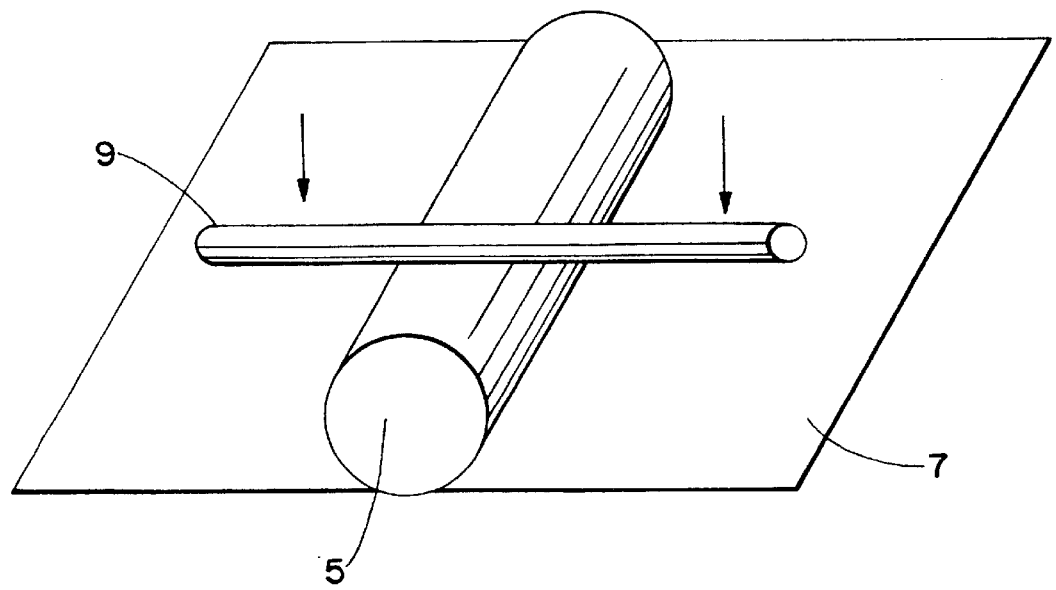
FIG. 6 is a perspective view illustrating the manner in which a crush test was performed on both comparative cells and cells constructed in accordance with the present invention.

Lots 1 and 2 were constructed as control lots. Each control cell had positive electrodes that were 490.2 mm and negative electrodes that were 546.1 mm in length. The positive electrodes (preferably having aluminum conductive foil strips) were coated with $LiCoO_2$, while the negative electrodes (preferably having copper conductive foil strips) were coated with mesophase carbon fibers. The electrodes and separator layers were wound about a mandrel to form spiral-wound electrode assemblies that were inserted into 18650 (4/3A)-sized cell housings. Electrolyte was added and the cells were sealed and subsequently charged to 4.1 volts. Then, as shown in FIG. 6, each cell 5 was placed on a sturdy metal pad 7 and crushed by applying a downward force using a crushing rod 9 until a short circuit was detected whereby the cell voltage dropped from 4.1 volts to 0.1 volt or lower. If the crushed cell exhibited heavy smoke, fire, crimp release, or disassembly, the cell was considered to have failed the crush test. Otherwise, the cell passed the test. Control lot 2 differed from control lot 1 in that the cells of lot 2 had a core pin inserted into the center of the spiral-wound electrode. The core pins used for the control cells as well as the cells constructed in accordance with the present invention, were stainless steel tubes of 3.175 mm diameter, 55.245 mm in length, and 0.508 mm wall thickness.

Lots 3 and 4 differed from control lots 1 and 2, respectively, in that one row of burrs were formed by stitching a conductive tab having a width of 3.175 mm onto the trailing end of the negative electrode. Each tab included six stitches spaced 6.35 mm apart. Lots 5 and 6 differed from lots 3 and 4, respectively, in that the positive electrode had a total length of 520.5 mm, of which 25–30 mm of the trailing end of the positive electrode was left uncoated with the active positive electrode material mixture. Lots 7 and 8 differed from lots 3 and 4 in that two rows of burrs were provided by stitching a single 6.350 mm wide conductive tab on the negative electrode, as illustrated in FIGS. 7 and 8. Lots 9 and 10 differ from lot 7 in that the two rows of burrs are formed by stitching each of two conductive tabs, spaced 10.7 mm apart, to the negative electrode, and further differs in that an inert region is provided on the trailing end of the positive electrode. Lots 9 and 10 differ from one another in that lot 9 includes six stitches per row and lot 10 includes twelve stitches per row.

As apparent from Table 1, the provision of burrs proximate the trailing end of the negative electrode generally increases the likelihood that the cell will pass the crush test. As evidenced by the results with respect to lot 5, the most marked improvement occurs when an inert region on the trailing end of the positive electrode is provided for the burrs on the negative electrode to come into contact. By also providing a core pin (lot 6), only about 3.8 percent of the constructed cells fail the crush test. As also apparent from Table 1, by providing two rows of stitches and an inert region on the trailing end of the positive electrode, none of the test batteries failed. Thus, with such a construction, there would be no need to include a core pin to further improve performance in a crush test.

In addition to providing improved results for cells subjected to a crush test, the present invention also improves the likelihood that such electrochemical cells will pass both the overcharge abuse test and the thermal abuse test. When an electrochemical cell is being charged or exposed to increasing ambient temperatures, the spiral-wound electrode assembly inside the cell housing expands. Such expansion produces an internally generated force that pushes the outermost layers of the spiral-wound electrode against the inside walls of the cell housing thereby causing the burrs provided on the trailing end of the negative electrode to penetrate through the adjacent separator layer to create a short circuit prior to the occurrence of any runaway reactions. To verify the improved results during the thermal abuse and overcharge abuse tests, additional electrochemical cells were created, with a negative to positive capacity ratio of greater than 0.8:1, using the same configuration as that for lot 5 discussed above.

Some of these cells were overcharged at a 1 C rate (1.35 A constant current) for 150 minutes. The test was conducted at 21° C. During the overcharge, the expected short circuit is created from a uniform force created by the uniform expansion of the electrodes, causing the burrs to penetrate the adjacent separator layer and thereby provide the low resistance short between the inert regions of the positive and negative electrodes. The cells subjected to this test exhibited skin temperatures that approached 130–160° C. within 112 minutes on charge. At that point, the cells exhibited the expected short circuit and the cell voltage dropped suddenly from approximately 5 V or greater down to 1.5 V. The pressure vent on each cell was activated creating a temporary reduction in pressure, intermittent cell voltage recovery (to about 4.5 V), and eventually a permanent short circuit but with no fire or disassembly.

For the thermal abuse test, some of the cells constructed in accordance with the present invention were placed in an oven while the oven temperature was incrementally increased to 150° C. over a 25-minute period. At that point in time, the cell voltages and temperatures were about 3.8 V and 125° C. Within about 5 minutes at 150° C., the cells developed a sudden short circuit and the cell voltages dropped to zero. Autopsies performed on the cells showed that these short circuits were again created by the destruction control mechanism of the present invention whereby the burrs on the trailing end of the negative electrode penetrated the adjacent separator layer to create a short circuit to an inert region of the trailing end of the positive electrode. The pressure vent on each cell was activated but again there was no fire and no disassembly of the exposed cells.

To confirm that the presence of the destruction control mechanism did not adversely affect cell performance, cells from each lot were subjected to conventional performance tests. These tests showed that neither the cell's cycle life, fade rate, nor capacity was adversely affected.

Although the destruction control mechanism disclosed in this application is implemented using burrs 58 that are formed as a result of stitching conductive tab 56 to an inert portion 54 of an electrode 50, it will be appreciated by those skilled in the art that a destruction control mechanism may be implemented in many different ways. For example, the trailing edge of one (or both) of the electrodes may be cut so as to have numerous burrs formed along its edge. Further, a seam in the cell housing 10 may be formed having a sharp edge or a plurality of burrs projecting inward from the internal walls of the housing. Yet another approach would be to provide one or more burred edges on conductive tab 56.

Figure 9:
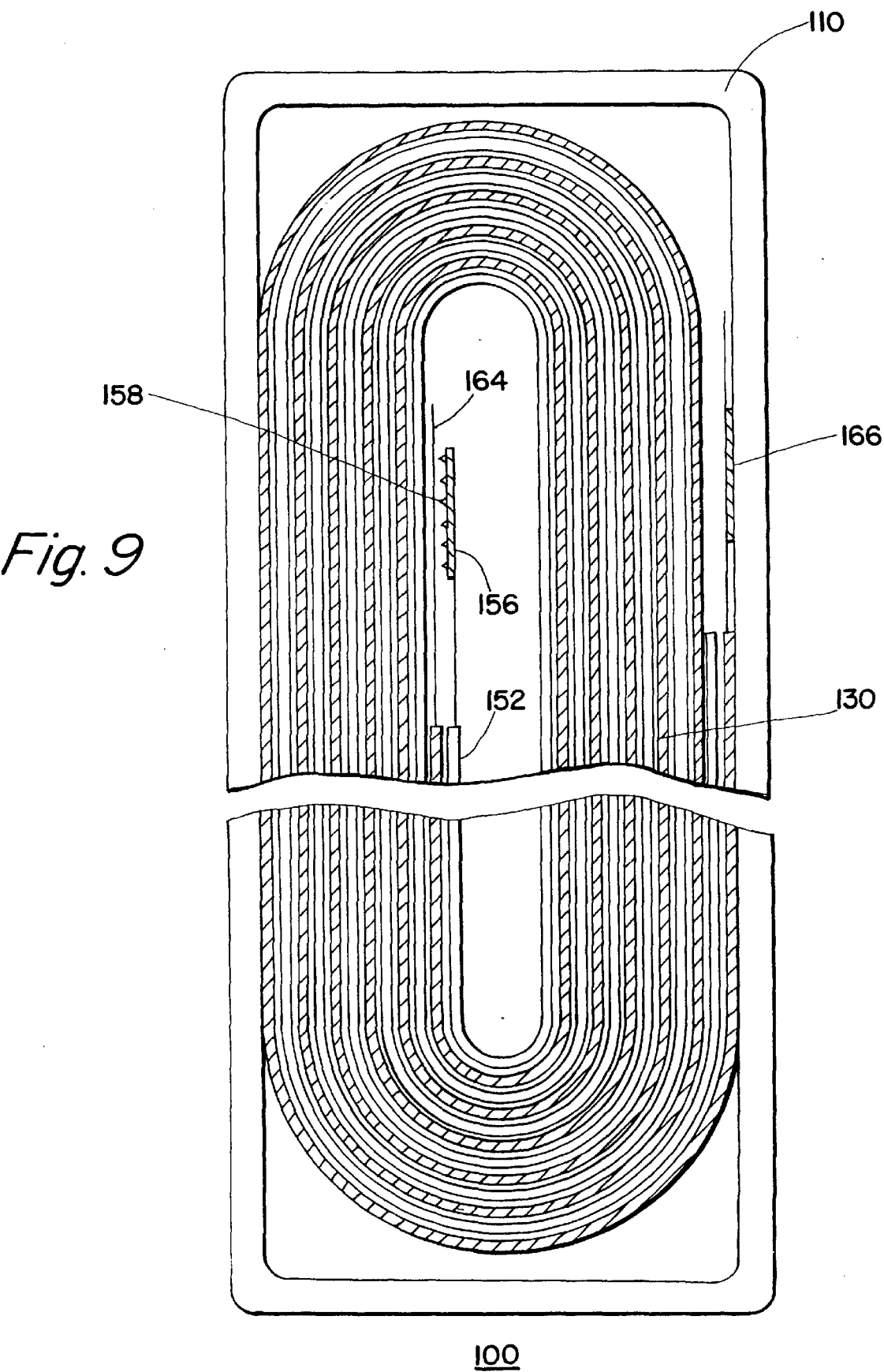
FIG. 9 is a cross-sectional view of a prismatic electrochemical cell constructed in accordance with a fifth embodiment of the present invention.
Figure 10:
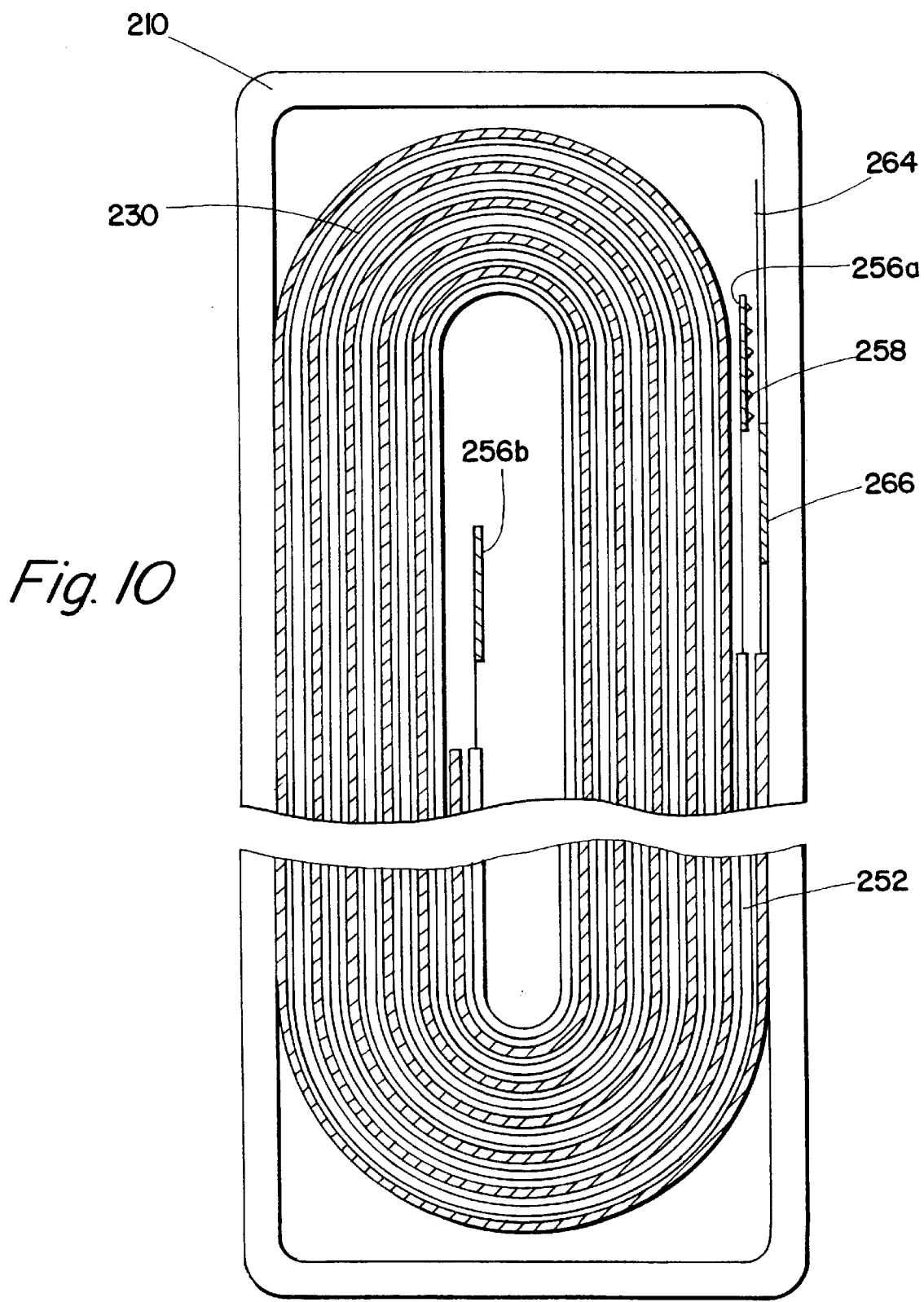
FIG. 10 is a cross-sectional view of a prismatic electrochemical cell constructed in accordance with a sixth embodiment of the present invention.

As shown in FIGS. 9 and 10, the destruction controlling mechanism of the present invention may be implemented in a cell having a prismatic construction. In the embodiment shown in FIG. 9, a prismatic cell 100 includes a housing 110 in which a spiral-wound electrode assembly 130 is disposed. Electrode assembly 130 includes a conductive tab 156 stitched to a leading end of a negative electrode 152 to form burrs 158. The positive electrode has an inert region 164 formed on its leading end in opposition to burrs 158, and has a conductive tab 166 formed on its trailing end. With this construction, an excessive force applied to the electrode assembly 130 would cause burrs 158 to penetrate a separator layer (not shown) and electrically contact inert region 164 to form a short circuit.

In the embodiment shown in FIG. 10, a prismatic cell 200 includes a housing 210 in which a spiral-wound electrode assembly 230 is disposed. Like prismatic cell 100, prismatic cell 200 includes a positive electrode conductive tab 266 and a negative electrode conductive tab 256*b*. Prismatic cell 200 differs from prismatic cell 100 in that the burrs 258 are provided on a second tab 256*a* that is stitched to the trailing end of the negative electrode 252 and the trailing end, rather than the leading end, of the positive electrode has an inert region 264 for opposing burrs 258. By positioning burrs 258 closer to the walls of housing 210, any heat generated from a short circuit caused by the burrs will be more readily dissipated to the outside of the cell. Alternatively, the inert region 264 may be omitted, so the burrs 258 may penetrate a separator layer (not shown) to electrically contact the housing 210, where the housing 210 is in electrical contact with the positive electrode.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the Doctrine of Equivalents.

The invention claimed is:

1. An electrochemical cell comprising:

a cell housing;

an electrode assembly including alternating layers of a first electrode, a separator, and a second electrode of polarity opposite that of said first electrode; and a destruction mechanism provided closer to an interior surface of said cell housing than a center of said electrode assembly for piercing a portion of said separator to create an internal short circuit between outermost layers of said first and second electrodes of said electrode assembly when an excessive force is applied to said destruction mechanism.

2. The electrochemical cell as defined in claim 1, wherein said destruction mechanism is positioned so as to create the initial short circuit prior to the creation of any other internal short circuits within the cell when an excessive force is applied to the exterior surface of said cell housing.

3. The electrochemical cell as defined in claim 1, wherein said destruction mechanism includes burrs formed at the end region of said first electrode and protruding toward said second electrode so as to penetrate through said separator and create an internal short circuit when excessive force is applied to said destruction mechanism.

4. The electrochemical cell as defined in claim 3, wherein said second electrode includes a conductive strip coated with active material except for an exposed portion underlying said burrs.

5. The electrochemical cell as defined in claim 3, wherein said burrs are formed by stitching a conductive tab to an end of said first electrode.

6. The electrochemical cell as defined in claim 1, wherein said electrode assembly is a spiral-wound electrode assembly including wound alternating layers of said first electrode, said separator, and said second electrode.

7. The electrochemical cell as defined in claim 6 and further including a core pin inserted in the core of said spiral-wound electrode assembly.

8. The electrochemical cell as defined in claim 1, wherein said cell housing and said electrode assembly are cylindrical.

9. The electrochemical cell as defined in claim 1, wherein said cell housing is prismatic.

10. The electrochemical cell as defined in claim 1, wherein the electrochemical cell is a primary cell.

11. The electrochemical cell as defined in claim 1, wherein the electrochemical cell is a rechargeable cell.

12. The electrochemical cell as defined in claim 3, wherein said first electrode is the negative electrode and said second electrode is the positive electrode.

13. The electrochemical cell as defined in claim 12, wherein said positive electrode includes a lithiated metal oxide and said negative electrode includes a lithium intercalable carbon.

14. An electrochemical cell comprising:

a cell housing an electrode assembly including alternating layers of a positive electrode, a separator, and a negative electrode;

destruction control means, responsive to a crushing force applied to an exterior surface of said cell housing, for causing the first of any internal short circuits to occur between outermost layers of said positive and negative electrodes of said electrode assembly closer to an interior surface of said cell housing than a center of said electrode assembly, wherein said negative electrode includes an active material coated on a conductive strip and has a conductive lead attached to an exposed end of said conductive strip that is not covered by said active material, and wherein the destruction control means comprises burrs formed on said exposed end of said conductive strip and extending towards the center of said electrode assembly.

15. The electrochemical cell as defined in claim 14, wherein said electrode assembly is a spiral-wound electrode assembly including wound alternating layers of said positive electrode, said separator, and said negative electrode.

16. The electrochemical cell as defined in claim 15 and further including a core pin inserted in the core of said spiral-wound electrode assembly.

17. The electrochemical cell as defined in claim 14, wherein said burrs are formed by stitching said conductive lead to said exposed end of said negative electrode.

18. An electrochemical cell comprising:

a cell housing; and an electrode assembly placed in said cell housing and including alternating layers of a first electrode, a separator, and a second electrode of polarity opposite that of said first electrode, wherein said first electrode includes an elongated conductive strip coated with an active material, said first electrode having a first exposed end not covered by active material to which a conductive tab is stitched, said stitched conductive tab forming burrs that project towards said second electrode for penetrating said separator to make electrical contact with said second electrode when a sufficient force is applied thereto.

19. The electrochemical cell as defined in claim 18, wherein said electrode assembly is a spiral-wound electrode assembly including wound alternating layers of said first electrode, said separator, and said second electrode.

20. The electrochemical cell as defined in claim 19 and further including a core pin inserted in the core of said spiral-wound electrode assembly.

21. The electrochemical cell as defined in claim 18, wherein said stitched conductive tab is positioned between the outermost layers of said first and second electrodes.

22. The electrochemical cell as defined in claim 18, wherein said first electrode is a negative electrode and said second electrode is a positive electrode.

23. An electrochemical cell comprising:

a cell housing; and a spiral-wound electrode assembly placed in said cell housing and including wound alternating layers of a first electrode, a separator, and a second electrode of polarity opposite that of said first electrode, wherein said first and second electrodes each include an elongated conductive strip coated with an active material, both said first and second electrodes having a first exposed end not covered by active material to which a conductive tab is attached, said second electrode having a second exposed portion at an end of said second electrode that is opposite said first exposed end of said second electrode, said second exposed portion of said second electrode being in an area underlying said first exposed end of said first electrode, said first electrode having burrs projecting towards said second exposed portion of said second electrode for penetrating said separator to make electrical contact with said second exposed portion of said second electrode when a sufficient force is applied thereto.

24. The electrochemical cell as defined in claim 23, wherein said first electrode is a negative electrode and said second electrode is a positive electrode.

25. The electrochemical cell as defined in claim 23, wherein said burrs on said first electrode and said second exposed portion of said second electrode are positioned at the outermost layers of said electrode assembly.

26. The electrochemical cell as defined in claim 23 and further including a core pin inserted in the core of said spiral-wound electrode assembly.

27. The electrochemical cell as defined in claim 23, wherein said burrs are formed by stitching said conductive tab to said first exposed end of said first electrode.

* * * * *